(12) United States Patent  (10) Patent No.: US 7,904,543 B2
Lindley  (45) Date of Patent: Mar. 8, 2011

(54) DYNAMICALLY GENERATING CUSTOM REPORTS USING SELF-DEFINING REPORT EVENTS

(75) Inventor: Craig A. Lindley, Colorado Springs, CO (US)

(73) Assignee: Computer Associates Think, Inc., Islandia, NY (US)

( * ) Notice: Subject to any disclaimer, the term of this patent is extended or adjusted under 35 U.S.C. 154(b) by 868 days.

(21) Appl. No.: 11/191,631

(22) Filed: Jul. 28, 2005

(65) Prior Publication Data

US 2007/0027982 A1   Feb. 1, 2007

(51) Int. Cl.
*G06F 15/173* (2006.01)
*G06F 15/16* (2006.01)
*H04L 12/28* (2006.01)
(52) U.S. Cl. .......................... 709/224; 709/229; 370/256
(58) Field of Classification Search .................. None
See application file for complete search history.

(56) References Cited

U.S. PATENT DOCUMENTS

| | | | |
|---|---|---|---|
| 5,499,340 A | | 3/1996 | Barritz |
| 5,590,056 A | * | 12/1996 | Barritz .................... 702/186 |
| 6,091,835 A | * | 7/2000 | Smithies et al. .............. 382/115 |
| 7,376,654 B1 | * | 5/2008 | Chau et al. .................. 707/100 |
| 2005/0138606 A1 | | 6/2005 | Basu et al. |
| 2006/0092861 A1 | * | 5/2006 | Corday et al. ................ 370/256 |

OTHER PUBLICATIONS

Notification of Transmittal of the International Search Report and the Written Opinion of the International Searching Authority for corresponding PCT patent application No. PCT/US2006/028829, mailed Oct. 14, 2008, (11 pages).

International Preliminary Report on Patentability from corresponding PCT Application Serial No. PCT/US2006/028829 mailed Nov. 24, 2008 (7 pages).

* cited by examiner

*Primary Examiner* — Wen-Tai Lin
(74) *Attorney, Agent, or Firm* — Baker Botts L.L.P.

(57) ABSTRACT

A reporting system comprises a plurality of reporting modules and a reporting server. Each reporting module comprises an executable data gatherer and an executable registration portion that dynamically registers the reporting module with the reporting server. The reporting server generates reports by invoking the data gatherers associated with registered reporting modules. The data gatherers generate self-describing report documents that contain data description information in addition to the report data. The reporting server encapsulates the report documents within events and stores the events in an event log along with other types of events related to the computing system. A user interface displays the report data using data description information contained in the report documents.

30 Claims, 6 Drawing Sheets

| | | | | |
|---|---|---|---|---|
| ⊕ | node0004 (Rack unknown, Slot unknown) | Associate Image | | Complete | 2005-07-05 10:35:37 |
| ⊕ | node0004 (Rack unknown, Slot unknown) | Move Node | | Complete | 2005-07-05 10:35:33 |
| ⊕ | Redhat | Allocate Node | | Complete | 2005-07-05 10:35:14 |
| ⊕ | node0006 (Rack unknown, Slot unknown) | Fail Node | | Complete | 2005-07-05 10:35:11 |
| ⊕ | node0006 (Rack unknown, Slot unknown) | Disassociate Image | | Complete | 2005-07-05 10:35:03 |
| ⊕ | IMAGEUTILIZATION | Report | Event containing gathered data | Complete | 2005-07-05 10:30:41 |
| ⊕ | Database | Tier Activated | Tier Activated | Satisfied | 2005-07-05 10:09:04 |
| ⊕ | node0005 (Rack unknown, Slot unknown) | Node Online | | Satisfied | 2005-07-05 10:09:04 |
| ⊕ | NodeTestVal (Rack LoclTestVal, Slot Loc2TestVal) | Node Online | | Satisfied | 2005-07-05 10:08:44 |
| ⊕ | NodeTestVal (Rack LoclTestVal, Slot Loc2TestVal) | Power Cycle Node | | Complete | 2005-07-05 10:08:19 |
| ⊕ | node0005 (Rack unknown, Slot unknown) | Power Cycle Node | | Complete | 2005-07-05 10:06:17 |
| ⊕ | Database | Tier Activated | | Transition | 2005-07-05 10:05:41 |

1 2 3 4 5 6 7 8 9 10 | All of | 1-500

DYNAMICALLY GENERATING CUSTOM REPORTS USING SELF-DEFINING REPORT EVENTS

TECHNICAL FIELD

The invention relates to computing systems and, more specifically, to techniques for generating reports for the computing systems.

BACKGROUND

Today's information technology creates enormous quantities of data. To comprehend this data, users frequently desire reports summarizing and arranging the data in a concise and readable fashion. For example, a complex computing environment may involve a substantial number of computing devices, network resources, software components and other objects that continuously perform operations, respond to inputs, produce events, generate outputs and otherwise produce huge amounts of recordable data. Moreover, different users often need different types of reports. For instance, a report detailing financial transactions may be interesting to an officer in the accounts receivable department, but wholly uninteresting to a supply chain manager.

To address these needs, programmers often create specialized reporting tools for complex software systems. The programmers typically code and compile the reporting tools and distribute the tools to customers purchasing the software systems.

However, it is often difficult for the programmers of reporting tools to anticipate all of the types of reports needed by all the different classes of potential users. Often, programmers create reports tools that a particular customer does not need, and fail to create all of the reports actually needed by the customer. Programming and debugging these unneeded reporting tools adds cost to the software system. In addition, the unneeded reporting tools increase the size of the software system, consuming valuable storage space and increasing the need for software updates. Moreover, a need for a new type of report often arises after the customer purchases the software system due to changing environment in which the system operates.

SUMMARY

In general, the invention is directed to dynamically extensible data gathering and reporting components that may be incorporated within a computing environment. When invoked, the components automatically generate self-describing reporting data that are stored in an event log for subsequent retrieval by a user or software agent.

The reporting techniques described herein provide a framework for deployment of standard or customized data gathering components within the computing environment. The data gathering components may generate the self-describing reporting data in accordance with a data description language, such as the extensible markup language (XML).

In one embodiment, a computing system comprises a plurality of reporting modules, wherein each reporting module contains an executable registration portion to register the reporting module and an executable data gatherer to collect data from a computing system and generate a report. The computing system further includes a report invocation module that invokes the data gatherers of registered reporting modules, and a presentation module which outputs the reports in a format viewable by a user.

In another embodiment, a computing system includes a plurality of reporting modules, wherein each reporting module contains an executable data gatherer to generate a report as a self-describing document. The computing system further includes an event log that contains events generated by components of the computing system, a reporting module that encapsulates the self-describing document in a report event and stores the report event the event log, and a presentation module to retrieve the report event from the event log and render the self-describing document encapsulated in the report event into a form viewable by a user.

In another embodiment, a method comprises invoking a reporting module to generate a report; encapsulating the report within an event; and storing the event within an event log of a computing system.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 6 is a screen illustration showing an exemplary user interface for reviewing a report.

DETAILED DESCRIPTION

Figure 1:
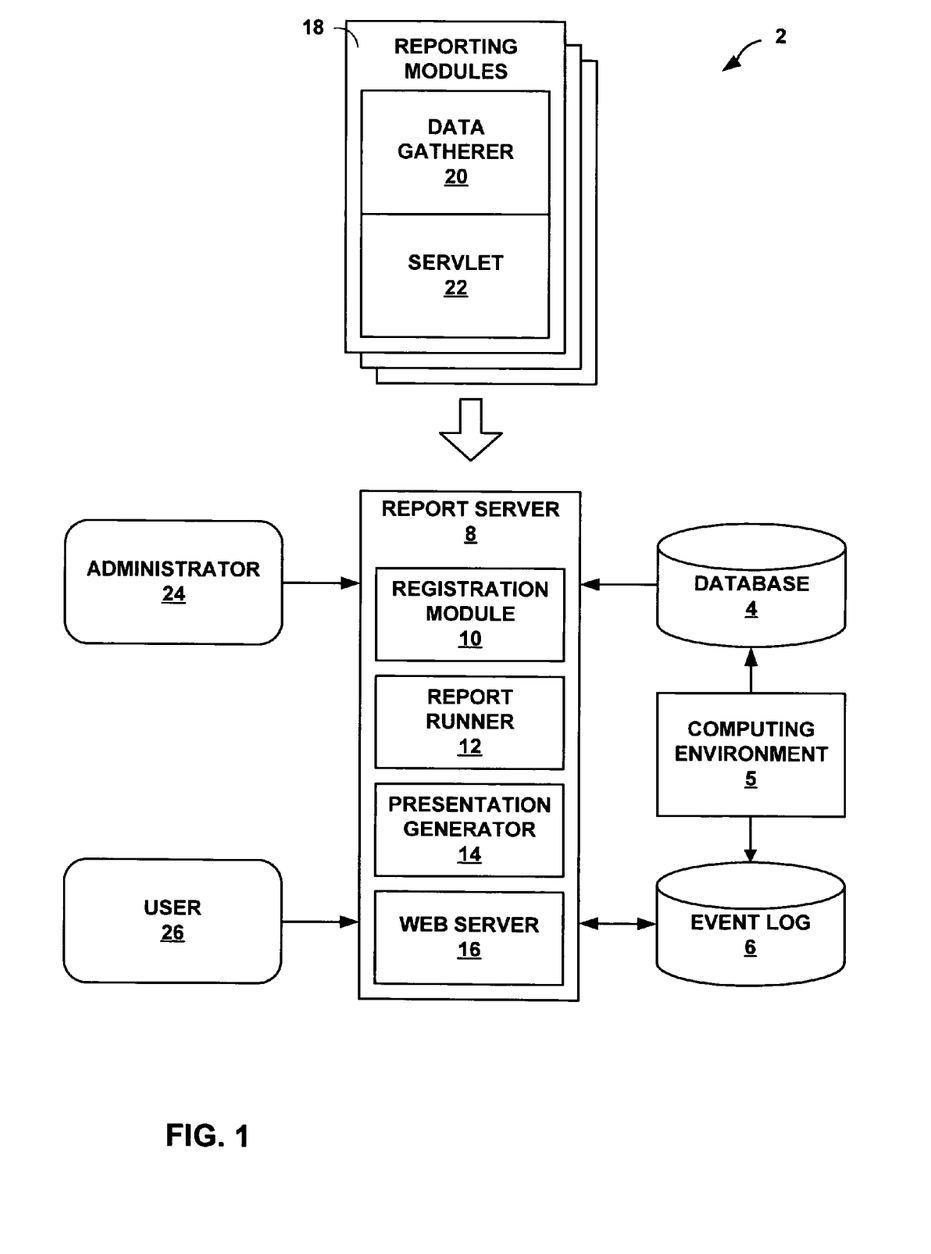
FIG. 1 is a block diagram illustrating an exemplary reporting system operating in accordance with the principles of this invention.

FIG. 1 is a block diagram illustrating an exemplary reporting system 2 operating in accordance with the principles of this invention. In this example, reporting system 2 interacts with computing environment 5 to provide self-describing reporting data. Computer system 5 represents any computing environment, such a collection of one or more servers, a network of computing devices, a distributed computing environment or other computing system. In one embodiment, computing environment 5 is an autonomic distributed computing environment described in copending and commonly assigned U.S. patent applications having Ser. No. 11/074,291, filed Mar. 7, 2005, and Ser. No. 11/047,468, filed Jan. 31, 2005, the entire content of each of which is incorporated herein by reference.

In this simplified example, computing system 5 maintains a database 4 and event log 6. Database 4 may, for example, contain data outputted by a computing environment 5. Event log 6 contains records of events generated with computing environment 5. For example, event log 8 may represent a system log, a transaction log, a database log or any other type of event log commonly used within a computing environment.

Report server 8 is responsible for generating reports using data from database 4 and possibly event log 6. In addition, report server 8 distributes reports stored in event log 6. In this embodiment, report server 8 contains four components: a registration module 10, a report runner 12, a presentation generator 14, and a web server 16. In other embodiments, these components may be distributed across one or more different machines. In addition, other embodiments may use a mechanism other than a web server to provide a user interface.

In accordance with the principles of the invention, reporting system 2 includes self-contained reporting modules 18 as input. Each of reporting modules 18 represents a self-contained software module capable of dynamically generating a report. As illustrated in FIG. 1, each of reporting module 18 includes a data gatherer 20 and a servlet 22.

Data gatherer 20 performs the substantive work of collecting specific data from computing environment 5 and formatting the data for subsequent presentation with one or more report. In one embodiment, data gatherer 20 is a Java Management Extension Management Bean (JMX MBean) that implements a data gatherer interface that provides a "gatherData" method. When invoked, the "gatherData" method collects and processes data in a specific manner. In other words, each reporting module 10 may implements the "gatherData" method in a different way in order to generate different types of reports. Like other MBeans, data gatherer 20 may conform to standard MBean naming conventions. That is, data gatherer 20 may have a class name and method names that conform to the standard naming convention. Conforming to these naming conventions allows other software components to identify MBeans and interact with MBeans in a uniform fashion.

Servlet 22 of each reporting module 18 is invoked when reporting module 18 is deployed (i.e., installed) or removed from report server 8. When an administrator 24 installed reporting module 18 on report server 8, servlet 22 automatically registers data gatherer 22 with registration module 10. In this manner, servlet 22 may be viewed as an executable registration portion of reporting module 18. Registration module 10 may implement an MBean server that allows other software components to easily invoke methods of reporting modules 18 MBeans registered with the MBean server. Specifically, an MBean server provides methods that return the names of MBeans that match criteria provided by the other software components. The names returned by registration module 10 conform to the MBean naming convention. Using these names, the other software components can invoke methods supplied by the MBeans. Thus, after servlet 22 registers data gatherer 20, other software component can easily invoke the "gatherData" method provided by data gatherer 20. When administrator 24 removes (i.e., uninstalls) reporting module 18 from report server 8, servlet 22 automatically deregisters data gatherer 20 from registration module 10.

Report runner 12 is responsible for invoking data gatherers 20 of reporting modules 18 and storing the resulting reports. As described in further detail below, data gathers 20 may produces the reports as self-describing XML documents. Moreover, report runner 12 may store each of the generated reports as a "report event" within event log 6. In other words, a special event type "report event" is used to log the generation and the report. Moreover, the report event contains the self-describing report that was generated at that time in XML format.

When a report runner 12 invokes the "gatherData" method of data gatherer 20, the data gatherer typically accesses computing environment 5 and/or database 4 to collect the particular data of interest to the report. Next, data gatherer 20 may perform one or more data manipulation routines on the retrieved data to generate corresponding report data. For example, the data manipulation routines may involve performing mathematical or statistical operations on the retrieved data. Data gatherer 20 then creates an XML document that contains the summarized report data and data description information, i.e., metadata. The data description information describes relationships among the report data. In the context of an XML document, the data description information comprises elements and attributes. For example, data description information might organize report data into tables or columns. In particular, the XML document conforms to a particular XML schema associated with the respective report. By interpreting the XML document in accordance with the XML schema, other software components can properly interpret the report data and embedded data description information of the XML document. In other words, the XML document is self-describing.

Report runner 12 may invoke data gathers 20 of reporting modules 18 in accordance with a defined schedule. For instance, administrator 24 may provide that report runner 12 invoke data gatherer 20 at specific dates and times, or at recurring intervals, at specific days of the week or other defined schedules. Moreover, administrator 24 may define conditions under which report runner 12 should invoke a particular reporting module 18. For example, administrator may define rules for controlling the automatic invocation of reporting modules 18 based on state changes to computing environment 5. In one embodiment, computing system 5 provides a forward-chaining rules engine for monitoring a current state of computing devices within the environment, as described in U.S. patent applications having Ser. No. 11/074, 291 and Ser. No. 11/047,468.

In any case, when invoking a reporting module 18, report runner 12 receives the dynamically generated, self-describing XML document from the respective data gatherer 20. Report runner 12 then creates a new "report event" that encapsulates the XML document. In addition, report runner 12 includes information that identifies the report. For instance, report runner 12 could include the name of the data gatherer that generated the report in order to identify the report. Report runner 12 inserts the new report event into event log 6 for storage with other types of events.

When needed, user 26 or administrator 24 may view the report through web server 16. Upon receiving a request, web server 16 directs presentation generator 14 to retrieve and generate web content that presents the report requested by user 26. In particular, presentation generator 14 scans through event log 6 for report events matching criteria provided by user 26 through web server 16. For example, user 26 may request to see all reports that where generated within a defined time period.

When presentation generator 14 finds a matching report event, presentation generator 14 extracts the XML document from the identified report event. Using the XML schema as a guide, presentation generator 14 parses the report data and data description information in the XML document. After parsing the XML document, presentation generator 14 may create a hypertext markup language (HTML) or an extensible hypertext markup language (XHTML) document that presents the report data specified by the XML document. Presentation generator 14 then makes this HTML document available to web server 16. Specifically, presentation generator 14 may apply Extensible Stylesheet Language (XSL) transformations to the XML document. The XSL transformations use the data description information in the XML document to determine the format of the resulting document. Administrator 24 can tailor these XSL transformations to suit the presentation preferences of user 26.

In this manner, reporting system 2 may provide a great deal of flexibility by which administrator 24 and user 26 may create and install custom reporting modules 18. Moreover, administrator 24 can freely choose which reports are maintained by the system by selectively installing or uninstalling reporting modules 18 from report server 8. There is no need to recompile computing environment 5 in order to add or remove reporting modules. Moreover, encoding reports in self-describing XML documents eliminates the need to have preprogrammed user interfaces in report server 8 for each type of report. In addition, self-describing XML documents may be easily parsed by a number of different applications for easy conversion into a data format desired by a user. Further, the dynamic generation of the reports and encapsulation within event log 6 may allow events to be readily available and easily accessible via administrator 24 and user 26.

Figure 2:
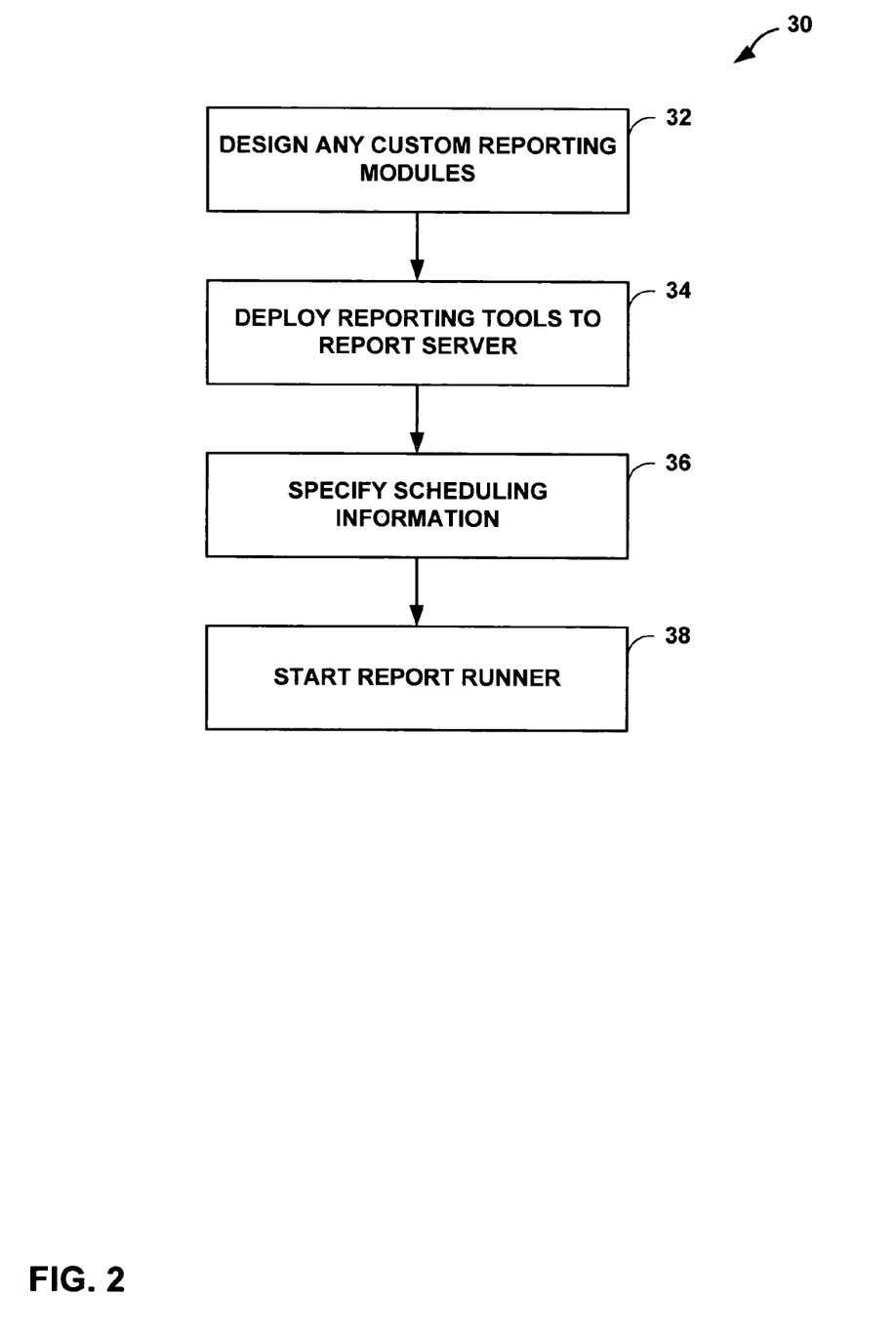
FIG. 2 is a flowchart illustrating an exemplary series of steps that an administrator of the reporting system may perform.

FIG. 2 is a flowchart illustrating an exemplary series of steps that administrator 24 of reporting system 2 (FIG. 1) may perform in initializing reporting system 2. Administrator 24 begins an administration cycle 30 by creating any custom reporting modules 18 (32). In creating the custom reporting modules, administrator 24 may consider the needs of user 26, the type of report data collected, the format for displaying the report data and other similar factors.

After creating any custom reporting modules, administrator 24 deploys the reporting modules to report server 8 (34). From the perspective of administrator 24, deploying the reporting modules may be as simple as copying the reporting modules into a directory in report server 8. Servlet 22 operates automatically to register the reporting modules 18 with registration module 10 without additional intervention from administrator 24.

Administrator 24 may also specify scheduling information for controlling the invocation of reporting modules 18 by report runner 12 (36). As discussed above, the scheduling information may instructs report runner 12 to run all or a portion of reporting module 18 at specific dates or times or at recurring intervals.

After entering the scheduling information into report runner 12, administrator 24 launches report runner 12 for automatic invocation of reporting module 18 (38).

Figure 3:
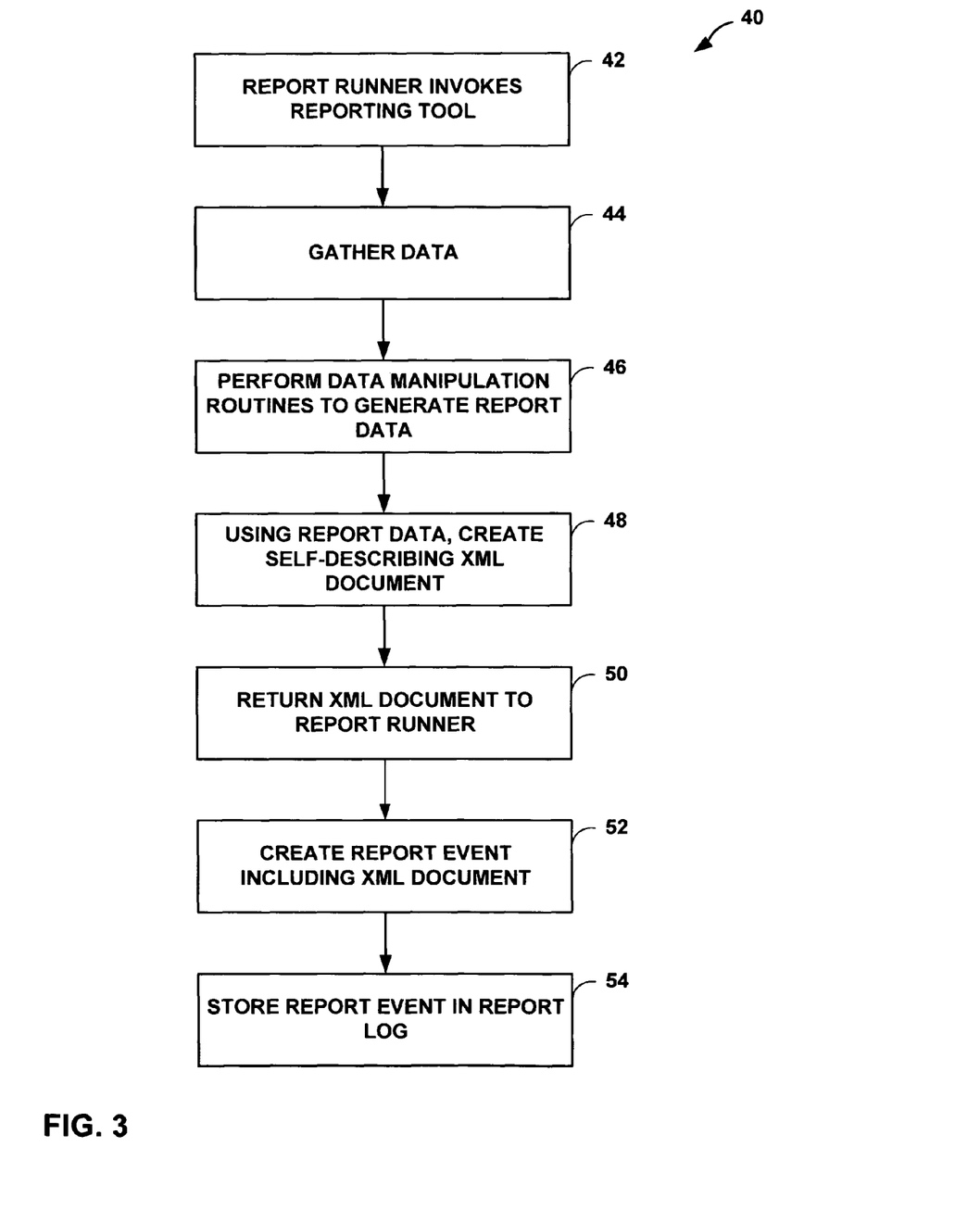
FIG. 3 is a flowchart illustrating an exemplary report generation cycle.

FIG. 3 is a flowchart illustrating an exemplary report generation cycle 40. Report generation cycle 40 begins when report runner 12 invoking a selected reporting module 18 (42). Specifically, report runner 12 invokes the "gatherData" method of data gatherer 20. Once invoked, data gatherer 20 accesses computing system 5 and/or database 4 to gather specific data for the report (44). Data gatherer 20 may perform data manipulation routines on the gathered data to generate report data (46). Using the report data, data gatherer 20 creates a self-describing XML document (48). Specifically, in one embodiment, data gatherer 20 dynamically generates an XML document containing the report data and the data description information in accordance with an XML schema associated with the type of report. The XML schema enables a reader, such as presentation generator 14, to interpret the report data and the data description information contained within the XML document.

After generating the XML document, data gatherer 20 outputs the XML document to report runner 12 (50). Report runner 12 creates a report event that encapsulates the XML document (52). The report event may also contain information that helps to identify the type of the report and a timestamp to identify when report runner 12 created the event. Finally, report runner 12 stores the report event in event log 6 (54).

Figure 4:
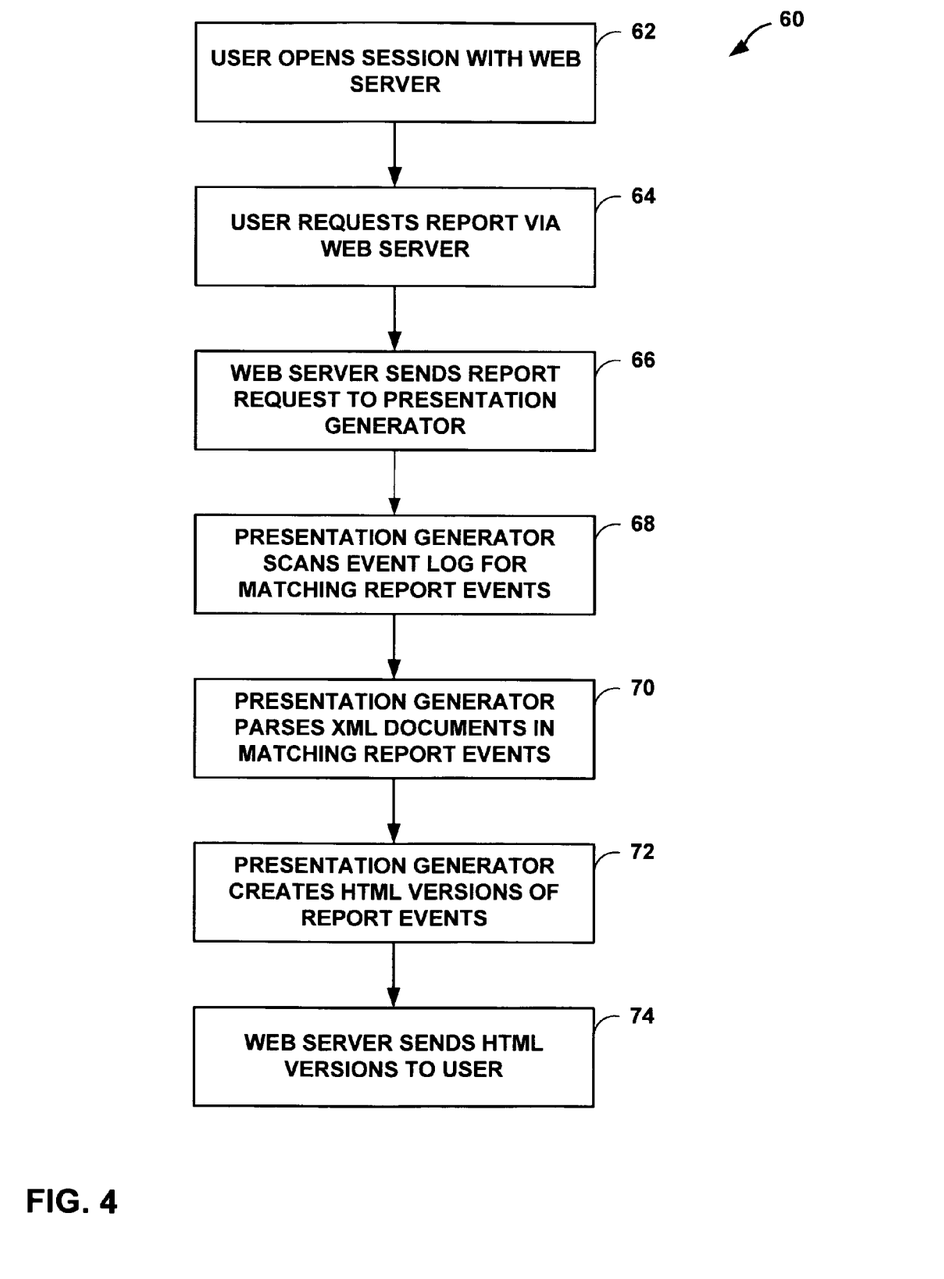
FIG. 4 is a flowchart illustrating an exemplary series of steps that occurs when a user of the reporting system views a report.

FIG. 4 is a flowchart illustrating an exemplary process of selecting and viewing one or more reports generated by reporting system 2. Initially, user 26 opens a session with web server 16 (62). Typically, opening a session with web server 16 involves directing a web browser to a web site served by web server 16. In addition, user 26 may have to supply credentials, such as a user name and password, for purposes of authentication. Once the session is open, user 26 interacts with web server 16 to request one or more reports (64). At this time, user 26 may provide one or more criteria for selecting a report, such as a particular type of report, a time period during which the report was generated or other criteria.

In response to the report request, web server 16 invokes presentation generator 14 (66). Using criteria in the request from web server 16, presentation generator 14 scans through event log 6 for report events matching the criteria (68). Whenever presentation generator 14 finds a report event that matches the criteria, presentation generator 14 parses the XML document contained in the report event (70). After parsing the XML document, presentation generator 14 renders an HTML version of the XML document (72). To create the HTML version, presentation generator 14 may apply an XSL transformation to the XML document. Once presentation generator 14 has created the HTML version, web server 16 outputs the HTML version of the report to user 26 (74).

Figure 5:
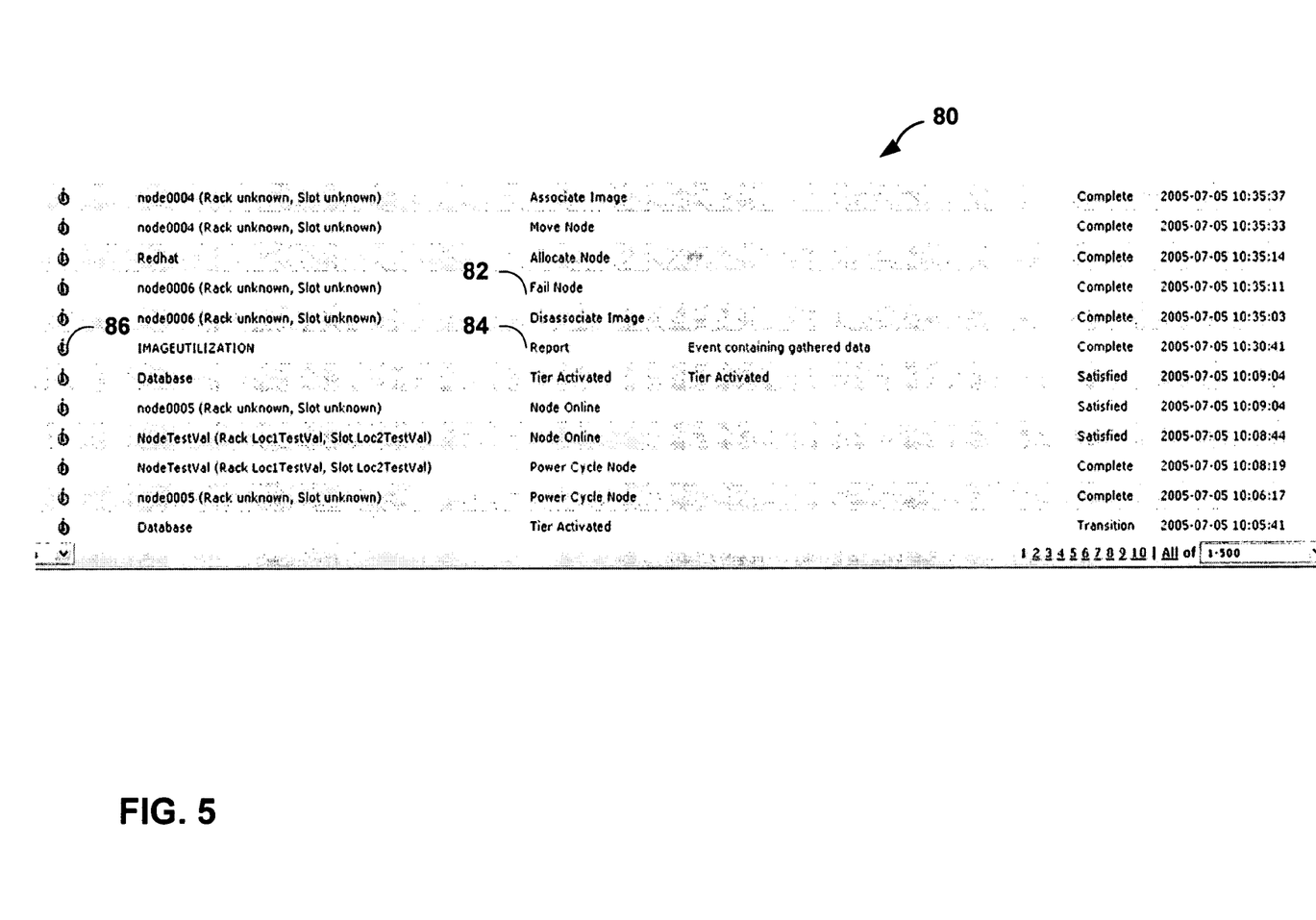
FIG. 5 is a screen illustration showing an exemplary user interface for reviewing an event log.

FIG. 5 is a screen illustration showing an example user interface 80 displaying an exemplary event log 6. As discussed above, event log 6 contains a variety of events generated by computing environment 5 and report server 8. In the example of FIG. 5, computing environment 5 is a distributed computing system having a set of automatically controlled computing nodes. Accordingly, many of the events displayed by interface 80 relate to operations of the distributed computing system. For example, an event 82 records that node 0006 of the distributed computing system failed at 10:35:11 on Jul. 7, 2005. Other events related to the allocation of the nodes and deployment of software images to the nodes are shown.

In addition, event log 6 includes a report event 84. Report event 84 indicates that an "IMAGE UTILIZATION" report was completed at 10:30:41 on Jul. 7, 2005. Further, report event 84 includes a comment describing the event. In this case, interface 80 provides a comment stating that report event 84 is an "event containing gathered data." For more detail on report event 84, or any other event, user 26 can click on the small "i" icon 86 located to the left of the events. In this manner, event log 6 stores report events commingled with other types of system events. This unified mechanism for storing events may allow administrator 24 and user 26 to more easily identify and view reports, as well as chronologically relate the reports to other system event that may have triggered the creation of the reports.

FIG. 6 is a screen illustration showing a user interface 90 displaying exemplary reports generated by reporting system 2. To access the screen presented by interface 90, user 26 has selected the "Image Utilization" report category from the list of available reports 92. User 26 then narrowed the range of "Image Utilization" reports by applying filter functions 94. In particular, user 26 elected to view all "Image Utilization" reports generated in the previous week. In a more technical sense, list of reports 92 and filter functions 94 provide a method through which user 26 enters the criteria with which presentation generator 14 searches event log 6.

Using these inputs from user 26, interface 90 displays a plurality of Image Utilization reports: reports 94, 96, 98, and a portion of report 100. Data for each of the reports is formatted in a table with seven columns: "Date", "Image", "Type", "Applications", "OS", "Tier", and "Nodes". Each row in the table contains an entry from an Image Utilization report. As displayed in interface 90, each of report 94, 96, 98 and 100 contains seven entries, one for each "image" type in the distributed computing system. In particular, each entry in the report provides data describing a different type of software image capable of being deployed with the distributed computing environment at the time data gatherer 20 generated the report. For example, on Jul. 05, 2005, at 10:30:40, the "CollageInventory (1.0)" image was deployed to one node in the "free pool" tier of the distributed computing system.

To prepare the data displayed in interface 90, data gatherer 20 generated an XML document for each of reports 94, 96, 98 and 100. As described above, the XML document contains all of report data generated by data gatherer 20 and the data description information that defines relationships among the report data. In XML, the data description information appears as elements and attributes. As one example, the XML document for report 94 displayed by interface 90 may be generated and encapsulated within a report event within event log 6 as follows:

```
<?xml version="1.0" encoding="UTF-8" standalone="yes" ?>
<gatheredData>
    <name>Image Utilization Report</name>
    <description>Image Utilization Gathered Data</description>
    <timeStamp>2005-07-05T10:30:40.993-06:00</timeStamp>
    <tables>
        <name>Image Utilization</name>
        <description>Image Utilization Data</description>
        <totalRowCount>8</totalRowCount>
        <totalColCount>6</totalColCount>
        <hasRowHeaders>false</hasRowHeaders>
        <hasColHeaders>true</hasColHeaders>
        <colHeaders>Image</colHeaders>
        <colHeaders>Type</colHeaders>
        <colHeaders>Applications</colHeaders>
        <colHeaders>OS</colHeaders>
        <colHeaders>Tier</colHeaders>
        <colHeaders>Nodes</colHeaders>
        <colInfos>
           <type>string</type>
           <width>25</width>
        </colInfos>
        <colInfos>
           <type>string</type>
           <width>25</width>
        </colInfos>
        <colInfos>
           <type>string</type>
           <width>25</width>
        </colInfos>
        <colInfos>
           <type>string</type>
           <width>25</width>
        </colInfos>
        <colInfos>
           <type>string</type>
           <width>25</width>
        </colInfos>
        <colInfos>
           <type>int</type>
           <width>6</width>
        </colInfos>
        <rows>
           <data>CollageDiagnostic (1.0)</data>
           <data>Diagnostic</data>
           <data>None</data>
           <data />
           <data>Maintenance Pool</data>
           <data>0</data>
        </rows>
        <rows>
           <data>CollageInventory (1.0)</data>
           <data>Inventory</data>
           <data>None</data>
           <data>RedHat FC 3 (2.6.9-1.681__FC3)</data>
           <data>Discovered Pool</data>
           <data>0</data>
        </rows>
        <rows>
           <data>CollageInventory (1.0)</data>
           <data>Inventory</data>
           <data>None</data>
           <data>RedHat FC 3 (2.6.9-1.681__FC3)</data>
           <data>Free Pool</data>
           <data>1</data>
        </rows>
        <rows>
           <data>RH-ELAS3-base (1.0)</data>
           <data>Linux</data>
           <data>None</data>
           <data>Linux (2.6.21-20.ELsmp)</data>
           <data>WebApp</data>
           <data>2</data>
        </rows>
        <rows>
           <data>RH-ELAS3-base (1.0)</data>
           <data>Linux</data>
           <data>None</data>
           <data>Linux (2.6.21-20.ELsmp)</data>
           <data>Database</data>
           <data>2</data>
        </rows>
        <rows>
           <data>RH-ELAS3-base (1.0)</data>
           <data>Linux</data>
           <data>None</data>
           <data>Linux (2.6.21-20.ELsmp)</data>
           <data>Redhat</data>
           <data>1</data>
        </rows>
        <rows>
           <data>RH-ELAS3-base (1.0)</data>
           <data>Linux</data>
           <data>None</data>
           <data>Linux (2.6.21-20.ELsmp)</data>
           <data>Business</data>
           <data>1</data>
        </rows>
    </tables>
</gatheredData>
```

The above XML code incorporates all report data and data description information for a single report into a "gatheredData" element. Within the "gatheredData" element, a "tables" element uses various attributes and elements to define the layout of a table. Within the "tables" element, "rows" elements describe the report data that is displayed in interface 90.

An XML schema defines the structure of the elements and attributes in the XML document. For example, the XML schema designates that the "rows" element contains six "data" elements. The XML schema for the XML document presented above may appear as follows:

```
<xsd:schema xmlns:xsd="http://www.w3.org/2001/XMLSchema">
<!-- Define high level object by type -->
<xsd:element name="gatheredData" type="GatheredDataType"/>
    <xsd:complexType name="GatheredDataType">
        <xsd:sequence>
        <xsd:element name="name" type="xsd:string"/>
        <xsd:element name="description" type="xsd:string"/>
        <xsd:element name="timeStamp" type="xsd:dateTime"/>
        <xsd:sequence>
            <xsd:element name="tables" minOccurs="1" maxOccurs="unbounded"
                type="TableType"/>
        </xsd:sequence>
        </xsd:sequence>
    </xsd:complexType>
<!-- Define the table type -->
<xsd:complexType name ="TableType">
    <xsd:sequence>
        <xsd:element name="name"              type="xsd:string"/>
        <xsd:element name="description"       type="xsd:string"/>
        <xsd:element name="totalRowCount"     type="xsd:int"/>
        <xsd:element name="totalColCount"     type="xsd:int"/>
        <xsd:element name="hasRowHeaders"     type="xsd:boolean"/>
        <xsd:element name="hasColHeaders"     type="xsd:boolean"/>
        <xsd:sequence>
            <xsd:element name="rowHeaders" minOccurs="0" maxOccurs="unbounded"
                type="xsd:string"/>
        </xsd:sequence>
        <xsd:sequence>
            <xsd:element name="colHeaders" minOccurs="0" maxOccurs="unbounded"
                type="xsd:string"/>
        </xsd:sequence>
        <xsd:sequence>
            <xsd:element name="colInfos" minOccurs="1" maxOccurs="unbounded"
                type="ColInfoType"/>
        </xsd:sequence>
        <xsd:sequence>
            <xsd:element name="rows" minOccurs="1" maxOccurs="unbounded"
                type="RowDataType"/>
        </xsd:sequence>
    </xsd:sequence>
</xsd:complexType>
<!-- Define the ColInfo type -->
<xsd:complexType name ="ColInfoType">
    <xsd:sequence>
        <xsd:element name="type">
            <xsd:simpleType>
                <xsd:restriction base="xsd:string">
                    <xsd:enumeration value="string"/>
                    <xsd:enumeration value="int"/>
                    <xsd:enumeration value="biginteger"/>
                    <xsd:enumeration value="date"/>
                    <xsd:enumeration value="currency"/>
                    <xsd:enumeration value="boolean"/>
                </xsd:restriction>
            </xsd:simpleType>
        </xsd:element>
        <xsd:element name="width" type="xsd:int"/>
    </xsd:sequence>
</xsd:complexType>
<!-- Define the row type -->
<xsd:complexType name ="RowDataType">
    <xsd:sequence>
        <xsd:element name="data" minOccurs="1" maxOccurs="unbounded"
            type="xsd:string"/>
    </xsd:sequence>
</xsd:complexType>
</xsd:schema>
```

Using the above described XML document and XML schema, presentation generator 14 can generate a version of the report for presentation to user 6 via a web browser. For instance, to generate interface 90, presentation generator 14 may have applied an XSL transformation to convent the XML document into an HTML document.

Various embodiments of the invention have been described. These and other embodiments are within the scope of the following claims.

The invention claimed is:

1. A computing system comprising:

a plurality of reporting modules, wherein each reporting module contains an executable registration portion to register the respective reporting module and an executable data gatherer to collect data from the computing system and generate a report based on the collected data; and a report server comprising:

at least one computer;

a registration module, executing on the at least one computer, that stores references to the registered reporting modules and returns lists of names of the registered reporting modules;

a report invocation module, executing on the at least one computer, that invokes the data gatherers of registered reporting modules, wherein the report invocation module retrieves the lists of names of the registered reporting modules from the registration module and invokes the data gatherers contained in the reporting modules using the lists of names; and a presentation module, executing on the at least one computer, that outputs reports generated by the plurality of reporting modules in a format viewable by a user, wherein the reports identify a plurality of software image types capable of being deployed to a device in the computing system.

2. The computing system of claim 1, wherein the reporting modules can be registered or deregistered without recompilation of any software in the computing system.

3. The computing system of claim 1, wherein the report invocation module encapsulates the reports within report events and inserts the report events into an event log associated with the computing system.

4. The computing system of claim 3, wherein the presentation module retrieves the reports from the event log.

5. The computing system of claim 3, wherein the event log stores other types of events generated by the computing system in addition to the report events produced by the reporting module.

6. The computing system of claim 1, wherein the report invocation module invokes the data gatherers contained in the reporting modules in accordance with a schedule.

7. The computing system of claim 1, further comprising an event log that stores events from the computing system and report events that contain the reports generated by the reporting modules.

8. The computing system of claim 1, wherein the report invocation module comprises a Management Bean server and the reporting modules conform to the specifications of Java Management Extensions Management Beans.

9. The computing system of claim 1, wherein the presentation module comprises:

a user interface to receive report requests from a user and display reports;

a report locator to locate a report requested by the user; and a presentation generator to transform the report located by the report locator into a form usable by the user interface.

10. The computing system of claim 1, wherein the report modules produce the reports in a format that conforms to a data description language.

11. The computing system of claim 10, wherein the data description language is extensible markup language ("XML").

12. The computing system of claim 9, wherein the presentation generator applies an extensible stylesheet language ("XSL") transformation to transform the reports.

13. The computing system of claim 1, wherein the executable data gatherer of each reporting module generates the report as a self-describing document, wherein the computing system further comprises an event log that contains events generated by components of the computing system, wherein the report invocation module encapsulates the self-describing document in a report event and stores the report event in the event log, and wherein the presentation module retrieves the report event from the event log and renders the self-describing document encapsulated in the report event into a form viewable by a user.

14. The computing system of claim 13, wherein the self-describing document is encoded in a data description language.

15. The computing system of claim 14, wherein the data description language is extensible markup language ("XML").

16. The computing system of claim 13, wherein the self-describing document comprises:

report data; and data description information to describe relationships among the report data.

17. The computing system of claim 1, wherein the computing system is a distributed computing system having an autonomic rules engine that applies a set of forward-chaining rules to control the generation of the reports.

18. A computer-implemented method comprising:

invoking executable registration portions of a plurality of reporting modules to register the reporting modules with a report server;

storing references to the registered reporting modules within a registration module of the report server;

returning lists of names of the registered reporting modules;

retrieving, with the report server, the lists of names of the registered reporting modules from the registration module;

invoking, with the report server, executable data gatherers of the registered reporting modules to collect data from the computing system and to generate reports based on the collected data;

encapsulating the reports within report events;

storing the report events within an event log of the computing system;

retrieving the report events from the event log; and rendering the reports encapsulated in the report events into a format viewable by a user, wherein the reports identify a plurality of software image types capable of being deployed to a device in the computing system.

19. The method of claim 18, further comprising storing other types of events generated by the computing system in addition to the report events.

20. The method of claim 18, wherein the reporting modules can be registered or deregistered without recompilation of any software in the computing system.

21. The method of claim 18, further comprising:

providing a user interface by which a user selects a report event from the event log;

retrieving the report event from the event log; and rendering the encapsulated report associated with the report event into a format viewable by the user.

22. The method of claim 21, wherein rendering the encapsulated report comprises:

parsing the report to identify report data and data description information in the form of XML metadata; and rendering a web page to present the report data in accordance with the metadata.

23. The method of claim 18, wherein the reports generated by the executable data gatherer comprise summarized report data.

24. The computing system of claim 1, wherein, for at least one of the reporting modules, the report generated by the executable data gatherer comprises summarized report data.

25. A computer-implemented method comprising:
invoking an executable registration portion of a reporting module within a plurality of reporting modules to register the reporting module with a report server;
storing references to the registered reporting modules within a registration module of the report server;
returning lists of names of the registered reporting modules;
retrieving, with the report server, the lists of names of the registered reporting modules from the registration module;
invoking, with the report server, an executable data gatherer of one of the registered reporting modules to collect data from the computing system and to generate a report based on the collected data; and
rendering the report into a format viewable by a user, wherein the report identifies a plurality of software image types capable of being deployed to a device in the computing system.

26. The method of claim 25, wherein the report generated by the executable data gatherers comprise summarized report data.

27. A computing system comprising:
at least one computer;
a plurality of reporting modules executing on the at least one computer, wherein each reporting module contains an executable registration portion to register the respective reporting module and an executable data gatherer to collect data and generate a report as a self-describing document based on the collected data;
an event log that contains events generated by components of the computing system;
a report invocation module that is operable to:
retrieve lists of names of registered reporting modules, invoke the data gatherers contained in the registered reporting modules using the lists of names, encapsulate a self-describing document produced by a data gatherer contained in at least one of the registered reporting modules in a report event, and
store the report event in the event log, wherein the report event contains the self describing document; and
a presentation module to retrieve the report event from the event log and render the self-describing document encapsulated in the report event into a form viewable by a user, wherein the self-describing document identifies a plurality of software image types capable of being deployed to a device in the computing system.

28. The computing system of claim 27, wherein the self describing document comprises summarized report data.

29. A computer-implemented method comprising:
invoking, with a report server, an executable registration portion of a reporting module within a plurality of reporting modules to register the reporting module with the report server;
identifying a name of the reporting module in a list of names of registered reporting modules, wherein the list of names of registered reporting modules is retrieved from a registration module;
invoking, with the report server, an executable data gatherer of the reporting module within the plurality of reporting modules to collect data from the computing system and to generate a report as a self-describing document based on the collected data;
encapsulating, with the report server, the self-describing document in a report event, wherein the report event contains the self-describing document;
storing the report event in an event log that contains events generated by components of the computing system;
retrieving the report event from the event log; and
rendering the self describing document encapsulated in the report event into a form viewable by a user, wherein the self-describing document identifies a plurality of software image types capable of being deployed to a device in the computing system.

30. The method of claim 29, wherein the self-describing document comprises summarized report data.

* * * * *